Feb. 3, 1959 H. NUSSBAUMER 2,872,003
ELECTROMAGNETIC REVERSING CLUTCH
Filed Oct. 26, 1955
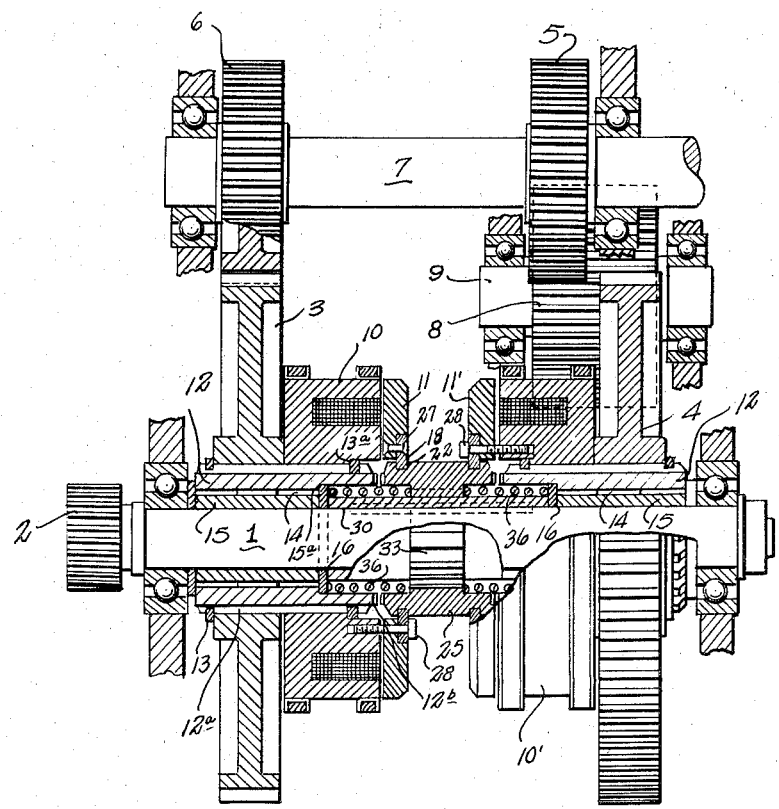
INVENTOR.
HUBERT NUSSBAUMER,
BY
ATTORNEYS.

2,872,003

ELECTROMAGNETIC REVERSING CLUTCH

Hubert Nussbaumer, Friedrichshafen, Germany; Anton Nussbaumer and Hermine Nussbaumer, heirs of said Hubert Nussbaumer, deceased, assignors to I-T-E Circuit Breaker Company, Philadelphia, Pa., a corporation of Pennsylvania Application October 26, 1955, Serial No. 542,969

Claims priority, application Germany July 8, 1955

2 Claims. (Cl. 192—51)

This invention relates to solenoid clutches and more particularly to a clutch for reversing the direction of rotation of a driven shaft.

It is an object of the invention to provide a construction such that no torque is transmitted to the shaft in the event of a failure of current to the solenoid elements.

It is a further object of the invention to provide a compact arrangement comprising a simple mechanism for effecting cessation of torque transmission in the event of current cut-off.

It is an additional feature of the invention to provide a clutch means of low moment of annular inertia.

Briefly my invention comprises a driven shaft on which are rotatively mounted a pair of solenoids which are axially spaced. Intermediate the solenoids a collar is slidably splined on the shaft having clutch teeth on the opposite edges thereof. The collar carries a respective armature for each solenoid. By means of suitably disposed springs the collar is centered intermediate the solenoids so as to maintain the clutch rings out of engagement with respective clutch rings driven by a source of mechanical power, which latter rings are the driving rings and rotate in opposite directions. Thus, the springs automatically maintain a central position of the armatures and the collar on which they are mounted so that no torque transmission is possible unless one or the other of the solenoids is energized to rotation of the shaft in one direction or the other. Accordingly, in the event of power failure, neither clutch rings of the collar is engaged. Likewise, by virtue of the spacing of the driving rings relative their respective driven rings simultaneous application of torque to the driven shaft is avoided.

My invention will now be described in conjunction with the appended drawings which show an elevation in cross-section of the invention.

Referring to the drawing, a driven shaft 1 having a power-take-off gear 2 carries a pair of gears 3 and 4 which are freely rotatable on the shaft. Gear 4 is driven by a gear 5 through a reverse idler 8. The gear 6 has direct drive with the gear 3. The gears 5 and 6 are mounted on the driving shaft 7, which shaft is provided with suitable bearings as shown. The idler gear 8 is mounted on a jack shaft 9 likewise carried in suitable bearings, it being understood that the idler gear is off set and suitably disposed so as to mesh properly with the gears 4 and 5. It will be apparent from the above that gears 3 and 4 are rotated in opposite directions by driving shaft 7.

A pair of solenoid magnets 10 and 10' having armatures 11 and 11' are provided. Each of the solenoids is mounted on a sleeve 12 to which it is keyed and it will be noted that gears 3 and 4 are likewise keyed on the same sleeve. Thus, the keying splines 12a serve to effect unison rotation with collar 12 of the gear 3 and the solenoid magnet 10, the same construction being had for solenoid magnet 10' and gear 4 mounted on its respective collar 12. It will likewise be noted that each collar 12 is in effect a clutch ring having teeth such as 12b provided on its inner peripheral edge as shown.

Suitable locking rings such as 13 and 13a are provided which may be set into slots in the splines 12a to hold each gear and solenoid magnet assembly against axial shifting. It will be understood that these locking rings may be spring rings of split construction so as to be forcible into place on the splines. Thus, the ring 13a would, of course, be put into position first and the ring 13 put into position last, since ring 13a abuts a shoulder within the solenoid magnet body as shown.

Each of the sleeves 12 is suitably mounted on needle bearings 14, which needle bearings are carried on sleeve 15 suitably fitted on shaft 1. Abutting the inner end of each sleeve 15 is a ring 16 carried on shaft 1 which maintains proper position of the sleeves 15, it being noted that each ring 16 engages an undercut shoulder such as 15a within each of the respective sleeves 12.

The armature plates 11 and 11' are carried in split rings 18 which fit into grooves 22 of a reciprocal collar 25. The collar 25 is provided at its outer edges with teeth engageable with the teeth 12b of either of the collars 12 depending upon the direction of shifting of the collar 25. Thus, if the magnet 10 is energized the armature 11 is pulled to the left to effect a forward drive from shaft 7 to shaft 1. On the other hand, if solenoid magnet 10' is energized the armature 11' is pulled to the right, thereby disengaging the direct drive clutch teeth and engaging the reversing drive clutch teeth since power is now transmitted from shaft 7 through idler 8 and gear 4 to shaft 1.

The split rings 18 may be fastened to the armature as by rivets 27; it will be noted, however, that bolts 28 pass slidably through the split ring and are threaded into the body of the solenoid magnet. Thus, it will be apparent that the armatures, while axially movable relative their respective solenoid magnets are rotative therewith, because of the bolts 28 any suitable number of which may be provided in angularly spaced array.

The clutch ring collar 25 is carried on a sleeve 30 which is keyed to the drive shaft 1, collar 25 being slidably splined on sleeve 30 as by the splines 33.

In order to provide for automatic centering of the armatures and disengagement of two sets of clutch rings, a spring 36 is carried on each side of the splines 33 of collar 25 and sleeve 30, such springs being carried on the sleeve 30 and being compression springs. Each spring 36 has its outer end bearing against a ring 16 and its inner end bearing against one end of the splines of collar 25 and sleeve 30. It will thus be apparent that when neither solenoid magnet is energized the spring 36 will effect centering of collar 25 so as to prevent any engagement of either pair of clutch rings. When, however, either of the solenoid magnets is energized, for example, the magnet 10, armature 11 will be pulled to the left, thus compressing its respective spring 36 and effecting engagement of the respective pair of clutch rings.

I claim:

1. A solenoid magnet operated reversible clutch comprising a driven shaft, a pair of magnets carried on said shaft and having relative rotation with respect thereto, means for rotating said solenoid magnets in opposite directions, a clutch ring keyed to each of said magnets and rotative therewith, a clutch ring sleeve intermediate said magnets and splined to said driven shaft and rotative therewith, said sleeve being slidable on said shaft and having a clutch ring on each end thereof selectively engageable with a respective clutch ring of one of said solenoid magnets, resilient means for maintaining said sleeve in position to prevent engagement of the clutch rings thereof with either of the clutch rings carried by said magnets, a pair of armatures spacedly carried by said sleeve for moving said sleeve in one axial direction or the other responsive to energization of one solenoid magnet or the other; said armatures being rotatively mounted on said sleeve, said armatures being axially movable with respect to respective solenoids and keyed thereto so as to be rotative therewith.

2. A solenoid magnet operated reversible clutch comprising a driven shaft, a pair of magnets carried on said shaft and having relative rotation with respect thereto, means for rotating said solenoid magnets in opposite directions, a clutch ring keyed to each of said magnets and rotative therewith, a clutch ring sleeve intermediate said magnets and splined to said driven shaft and rotative therewith, said sleeve being slidable on said shaft and having a clutch ring on each end thereof selectively engageable with a respective clutch ring of one of said solenoid magnets, resilient means for maintaining said sleeve in position to prevent engagement of the clutch rings thereof with either of the clutch rings carried by said magnets, a pair of armatures spacedly carried by said sleeve for moving said sleeve in one axial direction or the other responsive to energization of one solenoid magnet or the other; said armatures being rotatively mounted on said sleeve, said armatures being axially movable with respect to respective solenoids and keyed thereto so as to be rotative therewith, said resilient means for maintaining said sleeve in engagement preventing position comprising a pair of coil springs concentric with said driven shaft, said sleeve having an intermediate web, the inner ends of said springs engaging said web, and means carried by said shaft engaging the outer ends of said springs.

References Cited in the file of this patent

UNITED STATES PATENTS

| | | |
|---|---|---|
| 1,866,675 | Sarazin | July 12, 1932 |
| 2,649,941 | Doebeli | Aug. 25, 1953 |
| 2,658,593 | Doebeli | Nov. 10, 1953 |

FOREIGN PATENTS

| | | |
|---|---|---|
| 285,240 | Germany | May 26, 1914 |
| 509,205 | Great Britain | July 12, 1939 |
| 737,092 | Germany | July 5, 1943 |
| 630,533 | Great Britain | Oct. 14, 1949 |